Patented July 10, 1945.

2,379,965

UNITED STATES PATENT OFFICE 2,379,965

METAL SALTS OF POLYHYDROXYALKYL-DITHIOCARBAMIC ACIDS AND THEIR PREPARATION

Madison Hunt, Claymont, Del., assignor to E. I. du Pont de Nemours & Company, Wilmington, Del., a corporation of Delaware No Drawing. Application March 4, 1944, Serial No. 525,121

7 Claims. (Cl. 260—211)

This invention relates to metal salts of polyhydroxyalkyldithiocarbamic acids and to their preparation.

This invention has as an object the production of new and useful compositions of matter. A further object is the preparation of metal salts of polyhydroxyalkyldithiocarbamic acids. Other objects will be apparent from the following description of the invention.

These objects are accomplished by the following invention wherein a polyhydroxyalkylamine having at least one hydrogen on the nitrogen is reacted in an alkaline medium with carbon bisulfide. The invention also comprises the products which may be obtained, directly or indirectly, from the reaction, e. g., the salts of the formula

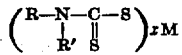

wherein M is a metal of valence $x$, $x$ is an integer from 1 to 3, R is a polyhydroxyalkyl radical, i. e., an alkyl radical having at least three hydrogens replaced by hydroxyls, and preferably the radical of a reducing sugar, and R' is hydrogen, hydrocarbon, or oxyhydrocarbon.

The more detailed practice of the invention is illustrated by the following example, wherein parts given are by weight. There are, of course, many forms of the invention other than this specific embodiment.

Example

To a solution of 12.5 parts of sodium dissolved in 600 parts of absolute ethyl alcohol is added 98 parts of N-methylglucamine. The mixture is stirred vigorously and 38 parts of carbon bisulfide is added drop-wise while maintaining a temperature of 25° C. The reaction mixture is stirred for three hours and is then filtered and the product washed with absolute alcohol. Recrystallization of the crystalline solid from aqueous ethyl alcohol yielded 85 parts of the monohydrate of the sodium salt of N-methyl-N-sorbityldithiocarbamic acid melting at 153–155° C. Analysis: Calculated for $C_8H_{16}NO_5S_2NaH_2O$: S, 20.57; $H_2O$, 5.78. Found: S, 20.02; $H_2O$ (loss of weight on drying) 5.30.

The metal salts of the polyhydroxyalkyldithiocarbamic acids can be prepared by treating an aqueous solution of an alkali metal salt of a polyhydroxyalkyldithiocarbamic acid prepared as described above with an aqueous solution of a salt of the desired metal. Thus copper salts of polyhydroxyalkyldithiocarbamic acids are produced when an alkali metal (e. g., sodium) salt of the polyhydroxyalkyldithiocarbamic acid is reacted with an aqueous solution of a copper salt, e. g., copper sulfate. The silver, gold, cadmium, zinc, tin, arsenic, antimony, bismuth, lead, and other heavy metal salts are preferred since they are less soluble in aqueous solutions and are therefore more readily prepared by double decomposition of solution of the sodium salt of the polyhydroxyalkyldithiocarbamic acid and an appropriate soluble salt of the heavy metal. The acid may be prepared from a suitable heavy metal salt, e. g., the lead salt, by passing hydrogen sulfide through an aqueous suspension thereof, filtering off the lead sulfide and concentrating the aqueous solution, desirably in an inert atmosphere. Alkali metal, e. g., potassium and lithium, alkaline earth, e. g. magnesium, and earth metal, e. g., aluminum, salts may be made from the aqueous solution of the acid and a carbonate or hydroxide of the metal.

Although the invention is illustrated by the metal salts of polyhydroxyalkyldithiocarbamic acids obtainable from methylglucamine, it is applicable to polyhydroxyalkyldithiocarbamic acid salts in general. Thus polyhydroxyalkylamines, other than methylglucamine, can be used in the process of this invention. Examples of such amines are those obtainable by the hydrogenation of a monosaccharide in the presence of ammonia or a primary amine as described in U. S. 2,016,962, U. S. 2,016,963 and U. S. 2,193,433. Examples of other polyhydroxyamines which may be used include glucamine, ethylglucamine, butylglucamine, hydroxyethylglucamine, phenylglucamine, 2-methoxyphenylglucamine, 2-hydroxyphenylglucamine, and benzylglucamine. These polyhydroxy amines are obtainable by the hydrogenation of glucose with ammonia, ethylamine, butylamine, monoethanolamine, aniline, anisidine, hydroxyaniline and benzylamine, respectively. Other polyhydroxyalkyl amines likewise thus obtainable by the hydrogenation of other sugars such as erythrose, ribose, arabinose, lyxose, gulose, galactose, xylose, mannose and fructose in the presence of ammonia and such primary amines are the polyhydroxyalkylamines such as trihydroxybutylamines, tetrahydroxyamylamines, pentahydroxyhexylamines and their N-ethyl, N-butyl, N-hydroxethyl, N-phenyl, N-o-methoxyphenyl, N-p-hydroxyphenyl, and N-benzyl derivatives. The hydroxyls are of course on different carbons.

Other solvents may be used as media for the preparation of the dithiocarbamic acid salts.

These include alcohols, such as methyl alcohol, propyl alcohol and isobutyl alcohol, and water.

The temperature at which the reaction is generally carried out is within the range 0 to 100° C. However, it is convenient to operate at or near room temperature.

The products of this invention are useful for various commercial purposes. They may be used as intermediates for the preparation of other derivatives of the polyhydroxyalkyl dithiocarbamic acids, as pharmaceuticals and pest control agents, e. g., bactericides, fungicides, insecticides, mothproofing agents and as additive agents for elastomers.

As many apparently widely different embodiments of this invention may be made without departing from the spirit and scope thereof, it is to be understood that this invention is not limited to the specific embodiments thereof, except as defined in the appended claims.

What is claimed is:

1. A metal salt of an N-polyhydroxyalkyldithiocarbamic acid wherein the N-polyhydroxyalkyl radical is that of a reducing sugar.

2. A heavy metal salt of an N-polyhydroxyalkyldithiocarbamic acid wherein the N-polyhydroxyalkyl radical is that of a reducing sugar.

3. A heavy metal salt of an N-sorbityldithiocarbamic acid.

4. A heavy metal salt of N,N-methyl-N-sorbityldithiocarbamic acid.

5. A salt of N-methyl-N-sorbityldithiocarbamic acid.

6. Process for the preparation of metal salts of dithiocarbamic acids having on the nitrogen the radical of a reducing sugar which comprises reacting an amine having on the nitrogen at least one hydrogen and the radical of a reducing sugar with carbon bisulfide in alkaline medium.

7. Process which comprises reacting N-methylglucamine with carbon bisulfide in alcoholic sodium ethylate solution.

MADISON HUNT.

---

CERTIFICATE OF CORRECTION.

Patent No. 2,379,965.                                July 10, 1945.

MADISON HUNT.

It is hereby certified that error appears in the printed specification of the above numbered patent requiring correction as follows: Page 2, second column, line 8, claim 4, for "N,N-methyl-N-sor-" read -- N-methyl-N-sor- --; and that the said Letters Patent should be read with this correction therein that the same may conform to the record of the case in the Patent Office.

Signed and sealed this 15th day of January, A. D. 1946.

Leslie Frazer (Seal)                    First Assistant Commissioner of Patents.

These include alcohols, such as methyl alcohol, propyl alcohol and isobutyl alcohol, and water.

The temperature at which the reaction is generally carried out is within the range 0 to 100° C. However, it is convenient to operate at or near room temperature.

The products of this invention are useful for various commercial purposes. They may be used as intermediates for the preparation of other derivatives of the polyhydroxyalkyl dithiocarbamic acids, as pharmaceuticals and pest control agents, e. g., bactericides, fungicides, insecticides, mothproofing agents and as additive agents for elastomers.

As many apparently widely different embodiments of this invention may be made without departing from the spirit and scope thereof, it is to be understood that this invention is not limited to the specific embodiments thereof, except as defined in the appended claims.

What is claimed is:

1. A metal salt of an N-polyhydroxyalkyldithiocarbamic acid wherein the N-polyhydroxyalkyl radical is that of a reducing sugar.

2. A heavy metal salt of an N-polyhydroxyalkyldithiocarbamic acid wherein the N-polyhydroxyalkyl radical is that of a reducing sugar.

3. A heavy metal salt of an N-sorbityldithiocarbamic acid.

4. A heavy metal salt of N,N-methyl-N-sorbityldithiocarbamic acid.

5. A salt of N-methyl-N-sorbityldithiocarbamic acid.

6. Process for the preparation of metal salts of dithiocarbamic acids having on the nitrogen the radical of a reducing sugar which comprises reacting an amine having on the nitrogen at least one hydrogen and the radical of a reducing sugar with carbon bisulfide in alkaline medium.

7. Process which comprises reacting N-methylglucamine with carbon bisulfide in alcoholic sodium ethylate solution.

MADISON HUNT.

---

CERTIFICATE OF CORRECTION.

Patent No. 2,379,965.   July 10, 1945.

MADISON HUNT.

It is hereby certified that error appears in the printed specification of the above numbered patent requiring correction as follows: Page 2, second column, line 8, claim 4, for "N,N-methyl-N-sor-" read -- N-methyl-N-sor- --; and that the said Letters Patent should be read with this correction therein that the same may conform to the record of the case in the Patent Office.

Signed and sealed this 15th day of January, A. D. 1946.

Leslie Frazer (Seal)

First Assistant Commissioner of Patents.